(12) United States Patent
Solomon

(10) Patent No.: US 7,597,310 B2
(45) Date of Patent: Oct. 6, 2009

(54) LEAF SPRING CONNECTION ASSEMBLY

(75) Inventor: Robert J Solomon, Auburn, WA (US)

(73) Assignee: PACCAR Inc, Bellevue, WA (US)

( * ) Notice: Subject to any disclaimer, the term of this patent is extended or adjusted under 35 U.S.C. 154(b) by 394 days.

(21) Appl. No.: 10/856,256

(22) Filed: May 27, 2004

(65) Prior Publication Data
US 2005/0263947 A1 Dec. 1, 2005

(51) Int. Cl.
*B60G 11/10* (2006.01)

(52) U.S. Cl. .................................... 267/264; 267/260

(58) Field of Classification Search ................ 267/264, 267/269, 270, 260, 263, 266, 271; 280/124.176, 280/124.17
See application file for complete search history.

(56) References Cited

U.S. PATENT DOCUMENTS

| | | | | |
|---|---|---|---|---|
| 1,111,015 A | * | 9/1914 | Evans | 267/29 |
| 1,844,463 A | | 2/1932 | Dodd | |
| 1,862,027 A | * | 6/1932 | Lord | 403/224 |
| 1,945,595 A | * | 2/1934 | Chilton | 267/269 |
| 2,022,213 A | * | 11/1935 | Lord et al. | 403/156 |
| 2,044,392 A | * | 6/1936 | Lord | 267/269 |
| 2,299,392 A | * | 10/1942 | Johnson et al. | 267/264 |
| 2,324,997 A | * | 7/1943 | Brown | 267/269 |
| 2,428,950 A | * | 10/1947 | Weiss | 280/485 |
| 3,117,772 A | * | 1/1964 | Brown | 267/269 |
| 3,434,707 A | * | 3/1969 | Raidel | 267/31 |
| 3,693,963 A | * | 9/1972 | Leighton | 267/269 |
| 3,841,655 A | * | 10/1974 | Schaeff | 280/124.116 |
| 3,945,325 A | | 3/1976 | Zehnder | |
| 4,083,545 A | * | 4/1978 | Herbenar | 267/266 |
| 4,826,140 A | * | 5/1989 | Rogers | 267/32 |
| 4,966,383 A | * | 10/1990 | Sjostrom | 280/404 |
| 5,035,406 A | * | 7/1991 | Sellers et al. | 267/48 |
| 5,046,752 A | * | 9/1991 | Stephens et al. | 280/678 |
| 5,129,672 A | * | 7/1992 | Hiromoto et al. | 280/124.106 |
| 5,897,107 A | * | 4/1999 | Zierden et al. | 267/267 |
| 5,988,614 A | * | 11/1999 | Sturmon | 267/292 |
| 6,118,083 A | * | 9/2000 | Boyovich et al. | 177/136 |
| 6,209,897 B1 | | 4/2001 | Bundy et al. | |
| 6,247,689 B1 | | 6/2001 | Haesle et al. | |
| 6,386,565 B1 | * | 5/2002 | Kugler | 280/124.165 |
| 6,430,774 B1 | | 8/2002 | McLaughlin et al. | |
| 6,527,287 B2 | * | 3/2003 | Hedenberg | 280/124.163 |
| 6,805,369 B2 | * | 10/2004 | Galazin | 280/124.116 |
| 2003/0025258 A1 | | 2/2003 | Collyer et al. | |
| 2003/0227117 A1 | | 12/2003 | McCarthy | |

* cited by examiner

*Primary Examiner*—Bradley T King
(74) *Attorney, Agent, or Firm*—Christensen O'Connor Johnson Kindness PLLC

(57) ABSTRACT

A leaf spring connection assembly (200) for coupling a leaf spring (202) to a vehicle is disclosed. The assembly includes a leaf spring having a spring eye (210) and a vehicle bracket (204) having a pair of recesses (214). The assembly further includes a pin (206) disposed through the spring eye. The pin includes end portions (224) which extend outward of the spring eye and which are at least partially received by the recesses of the vehicle bracket. Each of the end portions includes an annular groove (226). The assembly additionally includes a fastener (228) at least partially received in one of the annular grooves and coupled to the vehicle bracket to sandwich the pin between the vehicle bracket and the fastener.

17 Claims, 4 Drawing Sheets

LEAF SPRING CONNECTION ASSEMBLY

FIELD OF THE INVENTION

The present invention generally relates to leaf spring connection assemblies, and more particularly, relates to leaf spring connection assemblies for coupling a leaf spring of a vehicle's suspension system to the vehicle.

BACKGROUND OF THE INVENTION

Motorized vehicle suspension systems have been using leaf springs for over a 100 years. Before motorized vehicles, horse drawn carriages often utilized a leaf spring suspension system. Thus, there has existed a long felt need for a connection assembly for coupling an end of a leaf spring to a vehicle that is reliable, inexpensive, and includes only a few parts.

A previously developed connection assembly 100 attempting to satisfy this long felt need is depicted in FIG. 1. Referring to FIG. 1, a leaf spring 102 is depicted having a spring eye 104. A pin 106 is disposed through the spring eye 104. The ends of the pin 106 are coupled to a frame 108 of the vehicle (not shown). The frame 108 includes two saddles 110 for partially receiving each of the ends of the pin 106. The ends of the pin 106 are held in the saddles 110 by a pair of caps 112 which clamp the ends of the pin 106 within the saddles 110. Each of the caps 112 is bolted to the frame 108 through a pair of bolts 114, a pair of nuts 116, and a pair of washers 118.

Although somewhat effective, this previously developed connection assembly 100 is not without its problems. For instance, to couple the pin 106 to the frame 108, a pair of bolts 114, nuts 116, and washers 118, and a cap 112, must be manufactured to hold each end of the pin 106 within one of the saddles 110. Thus, to couple the pin 106 to the frame 108, fourteen parts (4 bolts, 4 nuts, 4 washers, and 2 end caps) must be manufactured, increasing the complexity and cost of the connection assembly 100.

Further, the pin 106 is a smooth cylindrical structure. Although relatively inexpensive to manufacture, if the clamping action of the cap 112 is less than optimum, there is a risk that the smooth pin 106 could axially work its way out of the spring eye 104.

Further, the caps 112 are expensive to manufacture since they must be both strong and made to close tolerances, further increasing the cost of the connection assembly 100. Further still, it has been found that the caps 112 often deform when stressed, decreasing the holding power of the cap 112 upon the pin 106, thereby increasing the risk of the pin 106 working loose. Further, since the bolts 114 and nuts 116 don't directly engage the pin 106, the tightness of the bolts 114 and nuts 116 does not always directly relate to the tension applied to the pin 106. For instance, even though the bolts 114 and nuts 116 are fully tightened, the full force of the bolts 114 and nuts 116 are not exhibited directly upon the pivot pin 106, thus making it possible for the pivot pin 106 to work loose when the caps 112 deform under load.

Thus, there exists a need for a connection assembly for coupling a leaf spring to a vehicle that is reliable, inexpensive to manufacture, and which has a reduced number of parts.

SUMMARY OF THE INVENTION

One embodiment of a leaf spring connection assembly formed in accordance with the present invention for coupling a leaf spring to a vehicle is provided. The leaf spring connection assembly includes a leaf spring having a spring eye and a vehicle bracket having a pair of recesses. The leaf spring connection assembly further includes a pin disposed through the spring eye of the leaf spring. The pin includes end portions extending outward of the spring eye which are at least partially received within the pair of recesses of the vehicle bracket, each of the end portions including a circumferentially disposed annular groove. The leaf spring connection assembly additionally includes a fastener at least partially received in one of the annular grooves. The fastener is coupled to the vehicle bracket so as to sandwich the pin between the vehicle bracket and the fastener.

One embodiment of a kit formed in accordance with the present invention for assisting the coupling of a leaf spring to a vehicle is provided. The kit includes a vehicle bracket having a pair of recesses, the vehicle bracket adapted to be coupled to a vehicle. The kit further includes a pin disposable through a spring eye of a leaf spring, the pin including end portions at least partially receivable within the pair of recesses of the vehicle bracket. Each of the end portions includes a circumferentially disposed annular groove. The kit also includes a fastener adapted to be at least partially received in one of the annular grooves. The fastener is further adapted to couple to the vehicle bracket and to sandwich the pin between the vehicle bracket and the fastener to removably couple a leaf spring to a vehicle.

An alternate embodiment of a leaf spring connection assembly formed in accordance with the present invention for coupling a leaf spring to a vehicle is disclosed. The leaf spring connection assembly includes a leaf spring and a vehicle bracket having a recess. The leaf spring connection assembly also includes a pivot shaft coupled to the leaf spring, the pivot shaft at least partially received within the recess of the bracket. The leaf spring connection assembly further includes a depression disposed in the pivot shaft and a fastener coupled to the vehicle bracket for retaining the pivot shaft in the recess of the vehicle bracket. The fastener is at least partially received in the depression of the pivot shaft to impede axial movement of the pivot shaft.

Another alternate embodiment of a leaf spring connection assembly formed in accordance with the present invention for coupling a leaf spring to a vehicle is disclosed. The leaf spring connection assembly includes a leaf spring and a vehicle bracket having a rounded recess and a pair of bores passing through a portion of the vehicle bracket. A pivot shaft is coupled to the leaf spring, the pivot shaft at least partially received within the rounded recess of the vehicle bracket. An annular groove is disposed in the pivot shaft. The leaf spring connection assembly also includes a U-bolt having a pair of legs and a bent portion connecting the legs. The legs pass through the pair of bores and the bent portion is disposed at least partially within the annular groove to clamp the pivot shaft at least partially in the rounded recess of the vehicle bracket.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
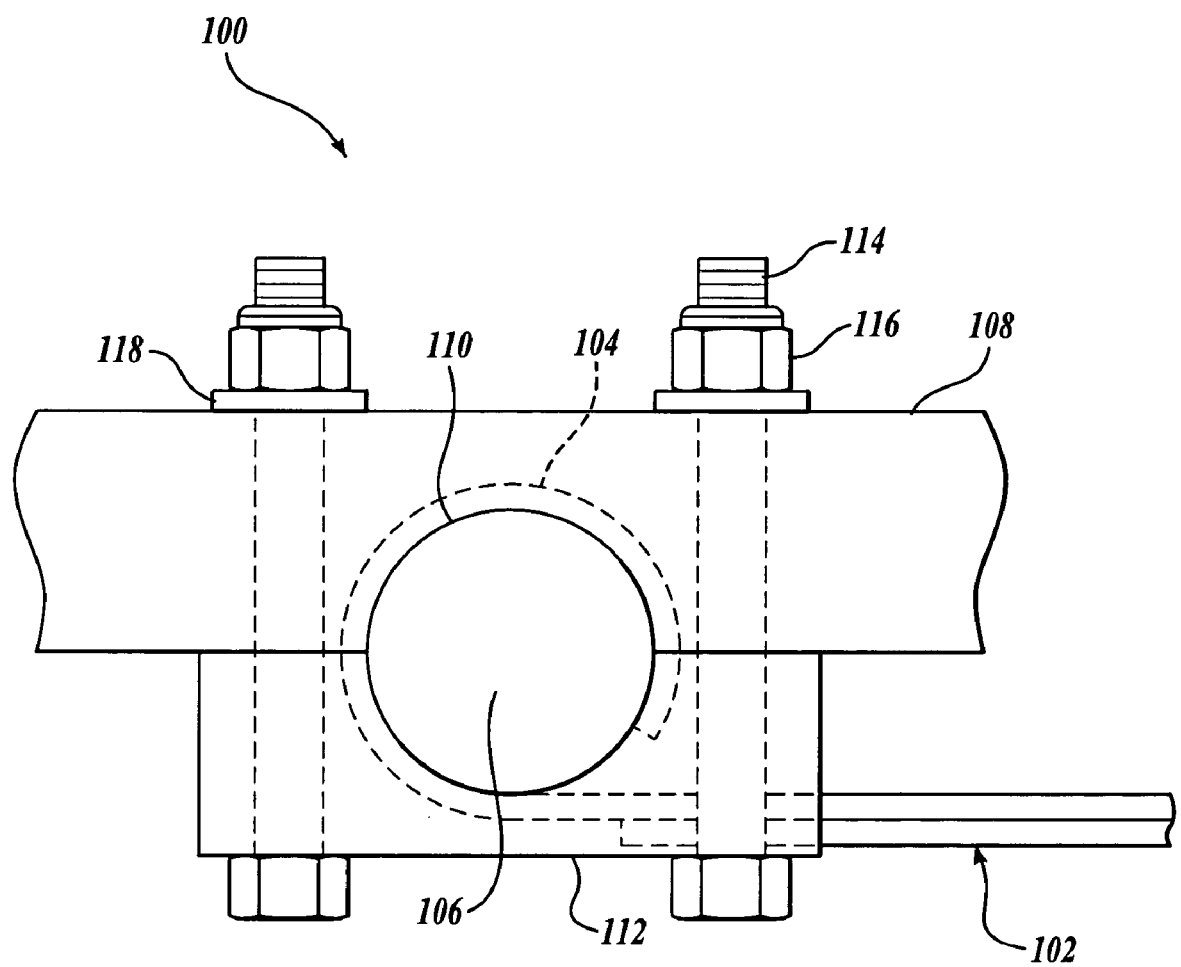
FIG. 1 is an elevation view of a previously developed leaf spring connection assembly.
Figure 2:
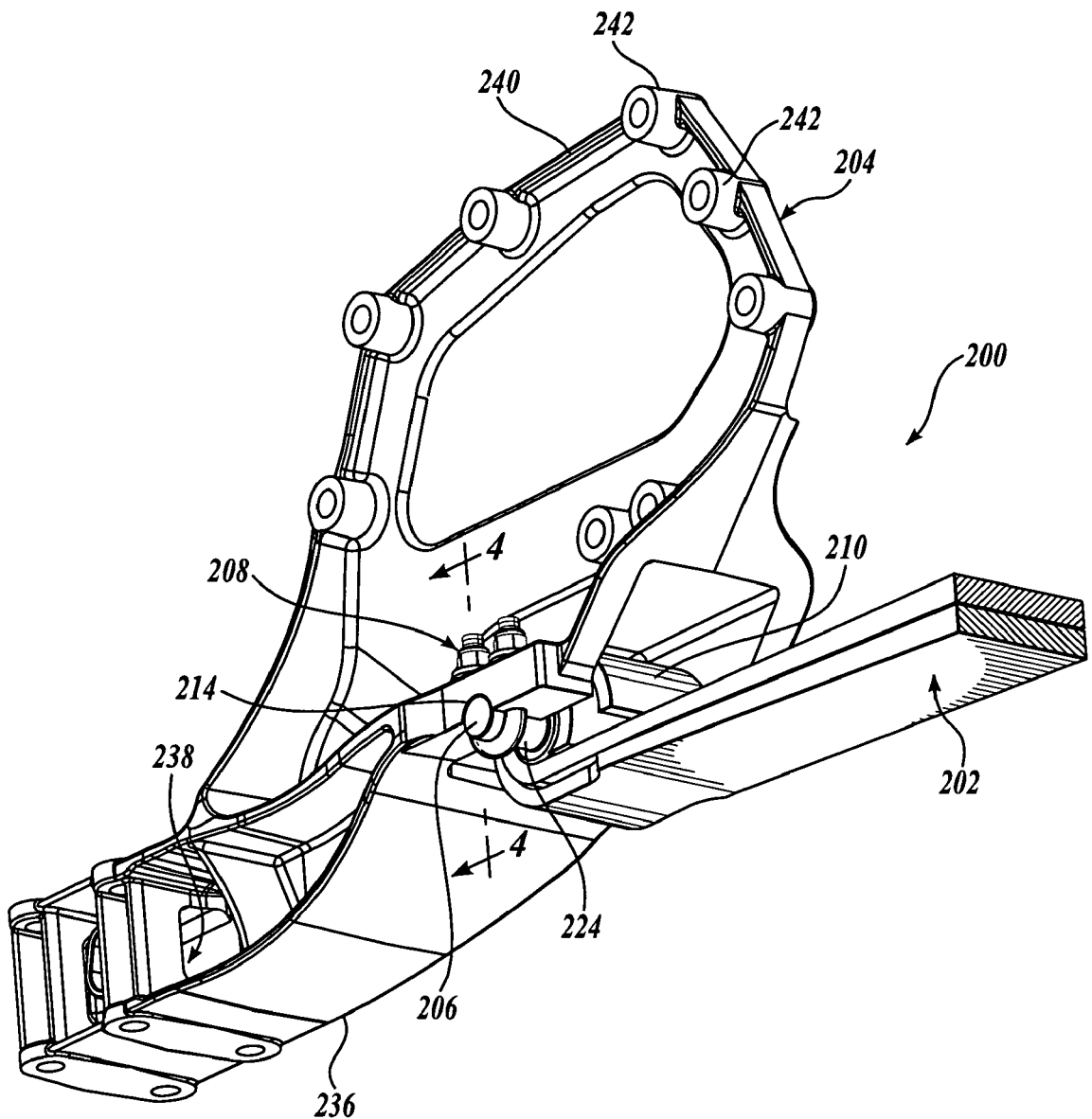
FIG. 2 is a perspective view of one embodiment of a connection assembly formed in accordance with the present invention for coupling a leaf spring to a vehicle.
Figure 3:
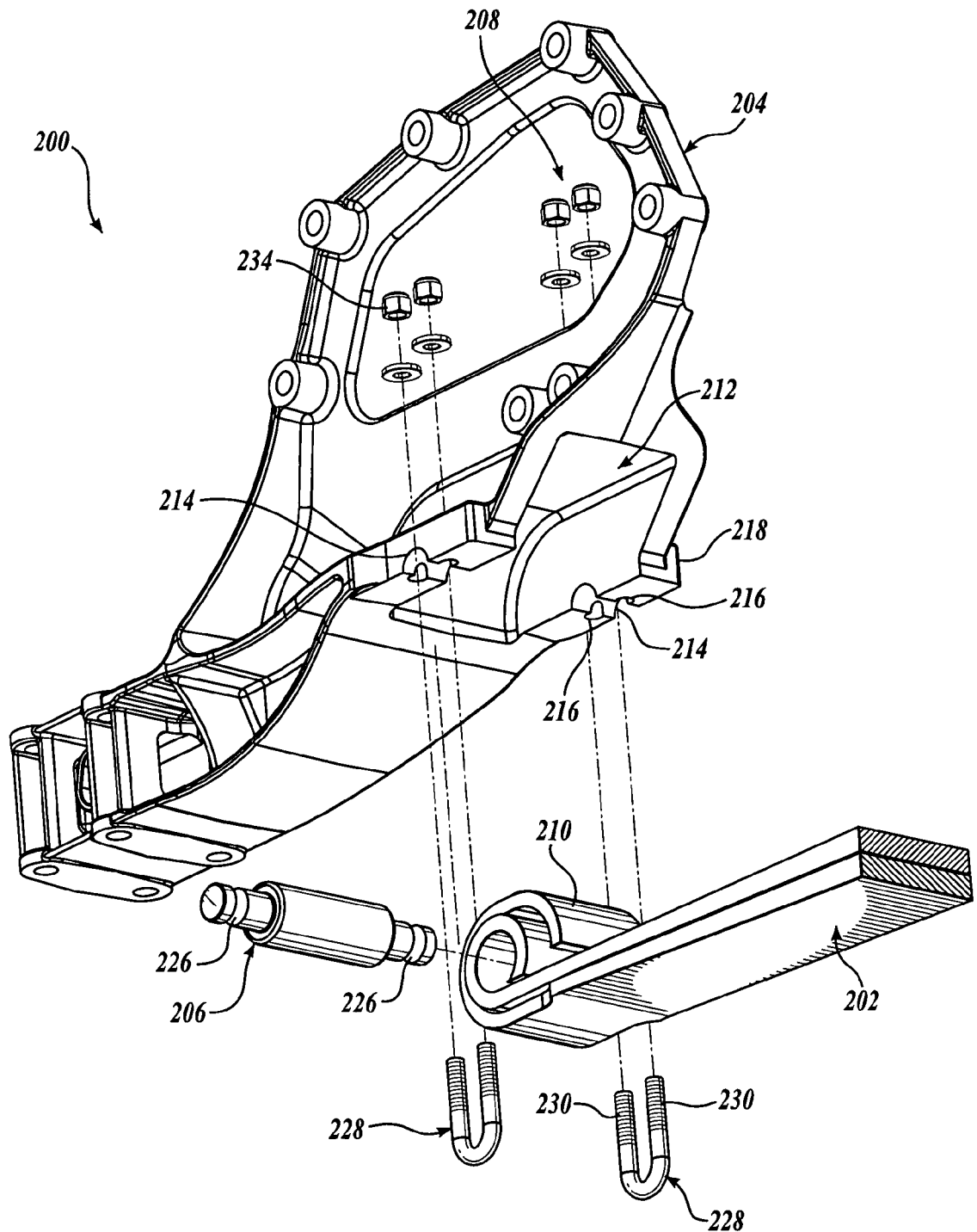
FIG. 3 is an exploded perspective view of the connection assembly of FIG. 2.
Figure 4:
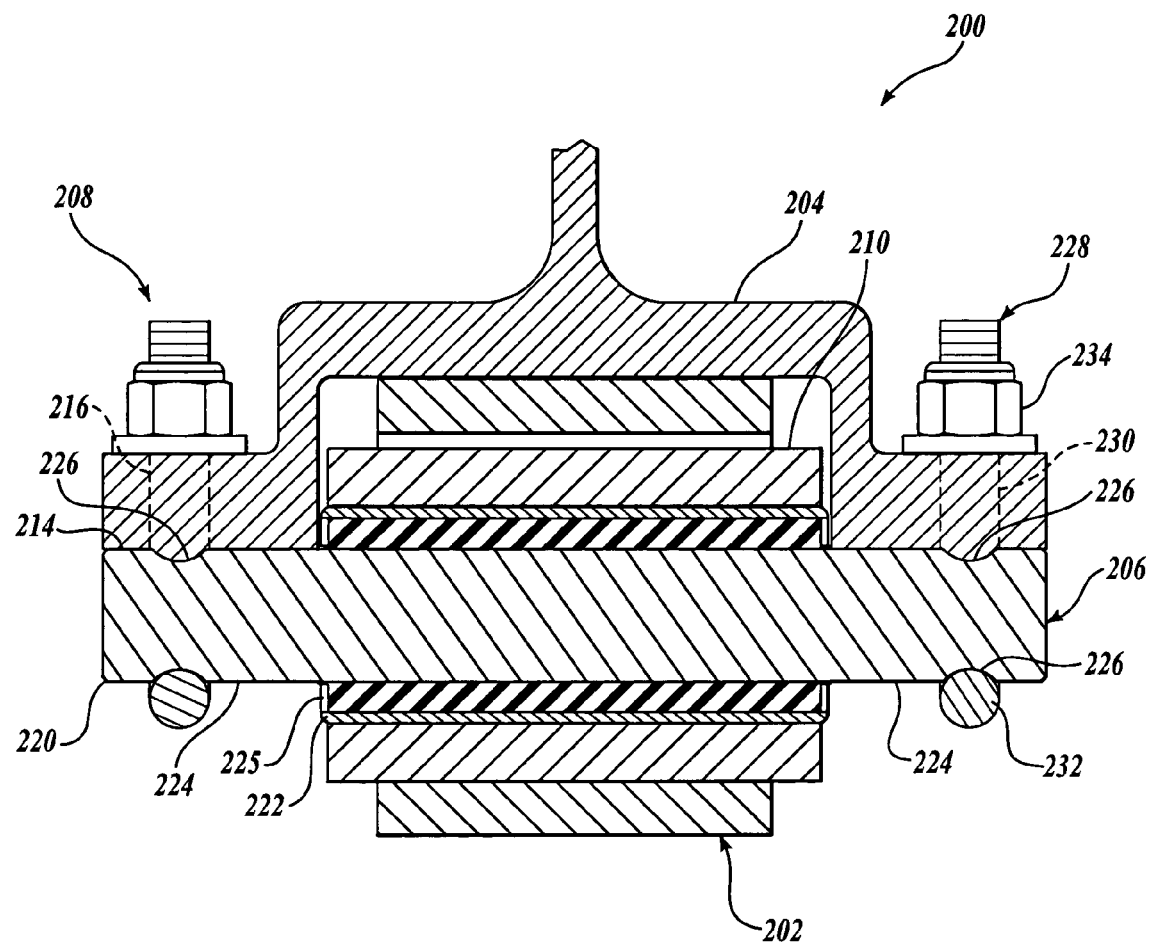
FIG. 4 is a cross-sectional view of a portion of the connection assembly of FIG. 2 taken substantially through Section 4-4 of FIG. 2.

One embodiment of a connection assembly 200 formed in accordance with the present invention is depicted in FIGS. 2-4. Referring to FIG. 2 and generally stated, the connection assembly 200 provides a means for pivotally and removably coupling an end of a leaf spring 202 to a vehicle (not shown). The connection assembly 200 includes the leaf spring 202, a vehicle bracket 204, a pivot pin 206, and a fastening assembly 208. Generally described, the pivot pin 206 is passed through a spring eye 210 of the leaf spring 202. The pivot pin 206 is in turn coupled to the vehicle bracket 204 (which is attached to the vehicle) via the fastening assembly 208, thereby pivotally and removably coupling the leaf spring 202 to the vehicle.

Turning to FIG. 3 and looking more specifically at the components of the connection assembly 200, the leaf spring 202 is a well known device composed of several layers of spring metal bracketed together and is used in the suspension of an axle (not shown) of the vehicle. The leaf spring 202 ends in the spring eye 210 which in the illustrated embodiment is substantially a horizontal cylinder used to facilitate attachment of the leaf spring 202 to the vehicle.

Referring to FIG. 2, the vehicle bracket 204 is adapted to couple to a frame of the vehicle (not shown) to provide an attachment point for the leaf spring 202. The illustrated vehicle bracket 204 is used for mounting a front leaf spring 202 for use in providing suspension for a front axle of a vehicle. The vehicle bracket 204 includes a base portion 236 extending fore and aft along the bottom of the vehicle bracket 204. A forward end of the base portion 236 includes an elongate passage 238, square in cross-section, for receiving a tow hook assembly (not shown). Extending vertically upward from the base portion 236 and configured in a fore and aft orientation is a front spring drive bracket 240. The front spring drive bracket 240 includes a plurality of mounting cylinders 242 disposed about a perimeter of the front spring drive bracket 240. The mounting cylinders 242 provide convenient means for mounting the vehicle bracket 204 to a frame rail of the vehicle, and permit the coupling of accessories to the vehicle bracket 204, a few suitable examples being a steering gear assembly and a radiator cross member.

Turning to FIG. 3, the vehicle bracket 204 also includes an open cavity 212 for at least partially receiving the spring eye 210 of the leaf spring 202. The open cavity 212 is sized and configured to permit the spring eye 210 to rotate a selected amount during use without binding against the vehicle bracket 204. The vehicle bracket 204 further includes a pair of saddles or recesses 214 in the base portion 236 for receiving the pivot pin 206 as will be described in further detail below. Preferably, the recesses 214 are half-round in shape and laterally oriented. The vehicle bracket 204 further includes a pair of vertically oriented bores 216 located on opposing sides of each of the recesses 214. The bores 216 pass entirely through a platform 218 disposed on each side of the open cavity 212 and on opposite sides of each of the recesses 214. The bores 214 are sized and configured to receive the legs of a U-bolt there through.

Referring additionally to FIG. 4, the pivot pin 206 is an elongated cylindrical object sized and shaped to be rotatably received within the spring eye 210 of the leaf spring 202. The pivot pin 206 includes an elongated center shaft 220 having an outer sheath 222 disposed about the center shaft 220. The outer sheath 222 is spaced from the center shaft 220, forming an annular space there between. This annular space is filled with a flexible material, one suitable example being a natural or synthetic rubber, forming a flexible bushing 225. The flexible bushing 225 may be bonded to both the center shaft 220 and the outer sheath 222. The flexible bushing 225 is preferably sufficiently pliable to aid in absorbing shock loads and to permit the outer sheath 222 to rotate a selected angular displacement relative to the center shaft 220 to permit the leaf spring 202 to rotate during use. The outer sheath 222 is sized to be received in the spring eye 210 in an interference fit relationship.

The center shaft 220 includes end portions 224 which extend laterally outward of the outer sheath 222 and spring eye 210. Disposed on each of the end portions 224 is a depression or groove 226. As best shown in FIG. 3, the grooves 226 are annular half-round grooves disposed about the entire circumference of the end portions 224. Although the grooves are described and illustrated as being disposed about the entire circumference of the end portions 224, it should be apparent to those skilled in the art that the grooves 226 may be alternately disposed only partially around the circumference of the end portions 224.

Each fastening assembly 208 includes a U-bolt 228. Each U-bolt 228 includes a pair of legs 230 and a bent portion 232 coupling the legs 230 together. Each U-bolt 228 has a round cross-section sized and shaped to be cooperatively received by the grooves 226. The legs 230 of the U-bolts 228 are sized to extend entirely through the bores 216. The distal end of each leg 230 is threaded to receive a nut 234 thereon.

Still referring to FIG. 4 and in light of the above description of the components of the connection assembly 200, the operation of the connection assembly 200 will now be described. In one method of installation, the pivot pin 206 is press fit into the spring eye 210. The leaf spring 202 is lifted upwards such that the end portions 224 of the pivot pin 206 are received within the recesses 214 (best seen in FIG. 3) in the vehicle bracket 204. The U-bolts 228 are then positioned such that the legs 230 of the U-bolts extend through the bores 216 and the bent portions 232 rest within the grooves 226 in the end portions 224 of the pivot pins 206. The nuts 234 are then coupled to the distal ends of the legs 230 of the U-bolts 228. As the nuts 234 are tightened, the center shaft 220 of the pivot pin 206 is clamped between the bent portions 232 of the U-bolts 228 and the vehicle bracket 204. The clamping of the center shaft 220 impedes the rotational and radial movement of the center shaft 220. Inasmuch as the bent portion 232 of the U-bolts 228 are received within the grooves 226 of the pivot pin 206, the pivot pins 206 are also impeded from axial movement by other than clamping forces, i.e., the physical interference of the bent portions 232 with the grooves 226.

Thus, in the illustrated embodiment, the pivot pin 206 is coupled to the bracket 208 using fewer parts than the previously developed connection assembly described above. Further, the need to manufacture caps is eliminated, reducing the cost and complexity of manufacturing the connection assembly 200. Further still, the U-bolts directly engage the pivot pin 206, thus the tightness of the nuts 234 is directly proportional to the clamping forces applied to the pivot pin 206, reducing the potential that the fasteners may be fully tightened, but insufficient clamping forces applied to the pivot pin 206 to prevent pin migration. Further still, the interaction of the U-bolts 228 with the grooves 226 aids in maintaining the axial alignment of the pivot pin 206. In the previously developed connection assembly described above, the axial alignment was maintained solely by the clamping force applied by the clamps, and thus prone to failure having no physical safeguards preventing axial movement, or at least requiring additional structures to impede axial movement of the pivot pin, increasing the complexity and cost of the connection assembly.

Although the above described and illustrated embodiment depicts the recesses, grooves, and U-bolts as having rounded cross-sections, it should be apparent to those skilled in the art that other shapes are within the spirit and scope of the present invention, such as recesses, grooves, and U-bolts having cross-sections representative of all or a portion of a perimeter of a shape having a polygonal, oval, parabolic, arcuate, linear, and/or rectangle shaped perimeter.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A leaf spring connection assembly for coupling a leaf spring to a vehicle comprising:
   (a) a leaf spring having a spring eye;
   (b) a vehicle bracket defining a surface facing in the direction of the ground, the surface having a pair of curved recesses, wherein the vehicle bracket further comprises a base portion extending fore and aft along the bottom of the vehicle bracket, wherein an end of the base portion includes an elongate passage that is square in cross section capable of receiving a tow hook assembly and the opposite end comprising the pair of curved recesses;
   (c) a pin disposed through the spring eye of the leaf spring, the pin including end portions extending outward of the spring eye and at least partially received within the pair of recesses of the vehicle bracket, wherein the pin diameter fits in the curve of the recesses, each of the end portions of the pin including a circumferentially disposed annular curved groove; and
   (d) a U-bolt having a pair of legs that extend through the vehicle bracket such that the legs terminate on the side of the bracket opposite to the ground, wherein the U-bolt is at least partially received in one of the annular grooves such that the diameter of the U-bolt fits in the curve of the groove and a curve defined by the bend in the U-bolt accepts the diameter of the pin at the groove, the U-bolt coupled to the vehicle bracket so as to sandwich the pin between the vehicle bracket and the U-bolt.

2. The leaf spring connection assembly of claim 1, wherein the pair of recesses of the vehicle bracket are is substantially half-round in shape.

3. The leaf spring connection assembly of claim 1, wherein the annular grooves are substantially half-round in shape.

4. The leaf spring connection assembly of claim 1, wherein the U-bolt includes a pair of legs connected to one another by a bent portion, and the vehicle bracket includes at least two bores each passing through a portion of the vehicle bracket, the legs of the U-bolt passing through the bores and the bent portion being disposed at least partially within one of the annular grooves.

5. A kit for assisting the coupling of a leaf spring to a vehicle comprising:
   (a) vehicle bracket defining a surface facing in the direction of the ground, the surface having a pair of curved recesses, the vehicle bracket adapted to be coupled to a vehicle, wherein the vehicle bracket further comprises a base portion extending fore and aft along the bottom of the vehicle bracket, wherein an end of the base portion includes an elongate passage that is square in cross section capable of receiving a tow hook assembly and the opposite end comprising the pair of curved recesses;
   (b) a pin disposable through a spring eye of a leaf spring, the pin including end portions at least partially receivable within the pair of recesses of the vehicle bracket, wherein the pin diameter fits in the curve of the recesses, each of the end portions of the pin including a circumferentially disposed annular curved groove;
   (c) a first U-bolt having a pair of legs that extend through the vehicle bracket such that the legs terminate on the side of the bracket opposite to the ground, wherein the U-bolt is adapted to be at least partially received in one of the annular grooves such that the diameter of the U-bolt fits in the curve of the groove and a curve defined by the bend in the U-bolt accepts the diameter of the pin at the groove; and
   (d) a second U-bolt having a pair of legs that extend through the vehicle bracket such that the legs terminate on the side of the bracket opposite to the ground, wherein the U-bolt is adapted to be at least partially received in the other of the annular grooves such that the diameter of the U-bolt fits in the curve of the groove and a curve defined by the bend in the U-bolt accepts the diameter of the pin at the groove, wherein the U-bolts are adapted to couple to the vehicle bracket and sandwich the pin between the vehicle bracket and the U-bolts to removably couple a leaf spring to a vehicle.

6. The kit of claim 5, wherein the pair of recesses of the vehicle bracket are substantially half-round in shape.

7. The kit of claim 5, wherein the annular grooves of the pin are substantially half-round in shape.

8. The kit of claim 5, wherein each U-bolt includes a pair of legs connected to one another by a bent portion, and the vehicle bracket includes at least two bores each passing through a portion of the vehicle bracket for each U-bolt, at least two bores being spaced apart and dimensioned to receive the legs of each U-bolt while the bent portion of each U-bolt is disposed at least partially within one of the annular grooves to couple the pin to the vehicle bracket.

9. A leaf spring connection assembly for coupling a leaf spring to a vehicle comprising:
   (a) a leaf spring;
   (b) a vehicle bracket defining a surface facing in the direction of the ground, the surface having a curved recess, wherein the vehicle bracket further comprises a base portion extending fore and aft along the bottom of the vehicle bracket, wherein an end of the base portion includes an elongate passage that is square in cross section capable of receiving a tow hook assembly and the opposite end comprising the pair of curved recesses;
   (c) a pivot shaft coupled to the leaf spring, the pivot shaft at least partially received within the recess of the bracket, wherein the pivot shaft diameter fits in the curve of the recess;
   (d) a curved depression disposed in the pivot shaft; and
   (e) a U-bolt having a pair of legs that extend through the vehicle bracket such that the legs terminate on the side of the bracket opposite to the ground, wherein the U-bolt is coupled to the vehicle bracket and retaining the pivot shaft in the recess of the vehicle bracket such that the diameter of the U-bolt fits in the curve of the depression and a curve defined by the bend in the U-bolt accepts the diameter of the pivot shaft at the depression, the U-bolt being at least partially received in the depression of the pivot shaft to impede axial movement of the pivot shaft.

10. The leaf spring connection assembly of claim 9, wherein the recess of the vehicle bracket is substantially half-round in shape.

11. The leaf spring connection assembly of claim 9, wherein the depression of the pivot shaft comprises an annular groove half-round in shape.

12. The leaf spring connection assembly of claim 9, wherein the U-bolt includes a pair of legs connected to one another by a bent portion and the vehicle bracket includes a pair of bores passing through a portion of the vehicle bracket, the legs passing through the bores and the bent portion being disposed at least partially within the depression to couple the pivot shaft to the vehicle bracket.

13. A leaf spring connection assembly for coupling a leaf spring to a vehicle comprising:
   (a) a leaf spring;
   (b) a vehicle bracket defining a surface facing in the direction of the ground, the surface having a curved, rounded recess and a pair of bores passing through a portion of the vehicle bracket, wherein the vehicle bracket further comprises a base portion extending fore and aft along the bottom of the vehicle bracket, wherein an end of the base portion includes an elongate passage that is square in cross section capable of receiving a tow hook assembly and the opposite end comprising the pair of curved recesses;
   (c) a pivot shaft coupled to the leaf spring, the pivot shaft at least partially received within the rounded recess of the vehicle bracket, wherein the pivot shaft diameter fits in the curve of the rounded recess;
   (d) an annular curved groove disposed in the pivot shaft; and
   (e) a U-bolt having a pair of legs that extend through the vehicle bracket such that the legs terminate on the side of the bracket opposite to the ground and a bent portion connecting the legs, the legs passing through the pair of bores and the bent portion being disposed at least partially within the annular groove such that the diameter of the U-bolt fits in the curve of the groove and a curve defined by the bend in the U-bolt accepts the diameter of the pivot shaft at the groove to clamp the pivot shaft at least partially in the rounded recess of the vehicle bracket.

14. The leaf spring connection assembly of claim 13, wherein the annular groove disposed in the pivot shaft is a circumferentially disposed rounded groove.

15. The leaf spring connection assembly of claim 14, wherein the annular groove is substantially half-round in shape.

16. The leaf spring connection assembly of claim 13, wherein the rounded recess of the vehicle bracket is substantially half-round in shape.

17. The leaf spring connection assembly of claim 13, wherein the pivot shaft includes a flexible material disposed between an outer sheath and a center shaft.

* * * * *

UNITED STATES PATENT AND TRADEMARK OFFICE
CERTIFICATE OF CORRECTION

PATENT NO. : 7,597,310 B2 Page 1 of 1
APPLICATION NO. : 10/856256
DATED : October 6, 2009
INVENTOR(S) : R. J. Solomon It is certified that error appears in the above-identified patent and that said Letters Patent is hereby corrected as shown below:

| COLUMN | LINE | ERROR |
|---|---|---|
| Title Page; (75) Pg. 1, col. 1 | Inventor | "Robert J Solomon," should read --Robert J. Solomon,-- |
| 5 (Claim 2, | 48 line 2) | After "bracket are" delete "is" |

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,597,310 B2　　　　　　　　　　　　　　　　　　　　　　　Page 1 of 1
APPLICATION NO. : 10/856256
DATED : October 6, 2009
INVENTOR(S) : Robert J. Solomon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 175 days.

Signed and Sealed this

Twenty-eighth Day of September, 2010

David J. Kappos
*Director of the United States Patent and Trademark Office*